(12) United States Patent
Shiina et al.

(10) Patent No.: US 10,364,845 B2
(45) Date of Patent: Jul. 30, 2019

(54) TAPERED ROLLER BEARING

(71) Applicant: JTEKT CORPORATION, Osaka-shi, Osaka (JP)

(72) Inventors: Ryo Shiina, Kashiwara (JP); Akiyuki Suzuki, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/842,351

(22) Filed: Dec. 14, 2017

(65) Prior Publication Data

US 2018/0180099 A1 Jun. 28, 2018

(30) Foreign Application Priority Data

Dec. 22, 2016 (JP) ................. 2016-249435

(51) Int. Cl.
*F16C 33/58* (2006.01)
*F16C 33/46* (2006.01)
*F16C 33/66* (2006.01)
*F16C 19/36* (2006.01)
*F16C 33/78* (2006.01)

(52) U.S. Cl.
CPC .......... *F16C 33/585* (2013.01); *F16C 19/364* (2013.01); *F16C 33/4605* (2013.01); *F16C 33/583* (2013.01); *F16C 33/6637* (2013.01); *F16C 33/6651* (2013.01); *F16C 33/7886* (2013.01); *F16C 33/6655* (2013.01)

(58) Field of Classification Search
CPC . F16C 33/6655; F16C 33/664; F16C 33/6685
See application file for complete search history.

(56) References Cited

U.S. PATENT DOCUMENTS

| 7,950,856 | B2 | 5/2011 | Sada et al. | |
|---|---|---|---|---|
| 9,797,449 | B2* | 10/2017 | Suzuki | F16C 19/364 |
| 9,982,718 | B2 | 5/2018 | Suzuki | |
| 2006/0245678 | A1* | 11/2006 | Chiba | F16C 19/364 |
| | | | | 384/571 |
| 2008/0219606 | A1 | 9/2008 | Sada et al. | |

FOREIGN PATENT DOCUMENTS

JP 2008-223891 A 9/2008
JP 2017-190849 A 10/2017

OTHER PUBLICATIONS

Suzuki et al.; U.S. Appl. No. 15/841,765, filed Dec. 14, 2017.
Sep. 26, 2018 Office Action issued in U.S. Appl. No. 15/841,765.

* cited by examiner

*Primary Examiner* — Thomas R Hannon
(74) *Attorney, Agent, or Firm* — Oliff PLC (57) ABSTRACT

A tapered roller bearing includes an outer ring having a first raceway surface, an inner ring having a second raceway surface, plural tapered rollers disposed between the first and second raceway surfaces, and a lubricating oil holding member fixed to an end portion of the outer ring. The lubricating oil holding member includes a tubular portion, an annular portion, and a projecting portion. The tubular portion is formed in the shape of a cylinder, and fixed to an end portion of the outer ring. The annular portion is formed in the shape of a circular ring. An end portion of the annular portion on the outer side is connected to an end portion of the tubular portion on one side. The projecting portion projects radially inward from the inner peripheral surface of the annular portion in the radial direction.

6 Claims, 11 Drawing Sheets

TAPERED ROLLER BEARING

INCORPORATION BY REFERENCE

The disclosure of Japanese Patent Application No. 2016-249435 filed on Dec. 22, 2016 including the specification, drawings and abstract, is incorporated herein by reference in its entirety.

BACKGROUND OF THE INVENTION

1. Field of the Invention

The present invention relates to a tapered roller bearing, and more particularly to a tapered roller bearing in which lubricating oil is supplied to a space in which tapered rollers roll.

2. Description of the Related Art

A tapered roller bearing includes an outer ring, an inner ring, a plurality of tapered rollers, and a cage. The tapered rollers are disposed with their center axes inclined with respect to the center axis of the tapered roller bearing. At least a part of an end face (hereinafter referred to as a "large end face") of each of the tapered rollers with the larger diameter is positioned on the outer side, in the radial direction, of the bearing with respect to an end face (hereinafter referred to as a "small end face") of the tapered roller with the smaller diameter.

Regarding the properties of the tapered roller bearing, it is requested to improve the durability against seizure between the large end faces of the tapered rollers and a surface (hereinafter referred to as a "large rib surface") of the inner ring that contacts the large end faces of the tapered rollers, for example. Therefore, there is known a tapered roller bearing in which a lubricating oil holding member is attached to an outer ring and lubricating oil is stored in a space between the lubricating oil holding member and the outer ring (Japanese Patent Application Publication No. 2008-223891 (JP 2008-223891 A), for example).

Such a tapered roller bearing is assembled to a differential device etc. of an automobile, for example, and disposed inside a housing. When the differential device is driven, a part of lubricating oil stored in the lower part of the tapered roller bearing is scattered to flow toward the outside of the tapered roller bearing. When lubricating oil stored in the lower part of the tapered roller bearing is reduced, the resistance against seizure of the tapered roller bearing may be lowered.

SUMMARY OF THE INVENTION

An object of the present invention is to provide a tapered roller bearing that allows suppressing a reduction of lubricating oil stored in the lower part of the tapered roller bearing.

An aspect of the present invention provides a tapered roller bearing that includes an outer ring, an inner ring, a plurality of tapered rollers, and a lubricating oil holding member. The outer ring has a first raceway surface on an inner peripheral surface thereof. The inner ring has a second raceway surface on an outer peripheral surface thereof, and is disposed coaxially with the outer ring. The tapered rollers are disposed in a space between the first raceway surface and the second raceway surface. The lubricating oil holding member is fixed to an end portion of the outer ring on one side in an axial direction. The lubricating oil holding member includes a tubular portion, an annular portion, and a projecting portion. The tubular portion is formed in a shape of a cylinder that extends in the axial direction, and fixed to an end portion of the outer ring on one side in the axial direction, of two end portions of the outer ring in the axial direction. The annular portion is formed in a shape of a circular ring that extends in a radial direction. An end portion of the annular portion on an outer side in the radial direction is connected to an end portion of the tubular portion on one side in the axial direction. The projecting portion projects radially inward from an inner peripheral surface of the annular portion in the radial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A tapered roller bearing according to an embodiment of the present invention will be described in detail below with reference to the drawings. In the drawings, the same or corresponding portions are given the same reference numerals to omit description.

In the drawings referenced in the following description, only main members of the embodiment of the present invention that are necessary to describe the present invention are illustrated for convenience of description. Thus, the present invention may include optional constituent members that are not illustrated in the drawings. The members in the drawings do not faithfully reflect the actual dimensions, the dimensional ratios among the members, etc.

Figure 1:
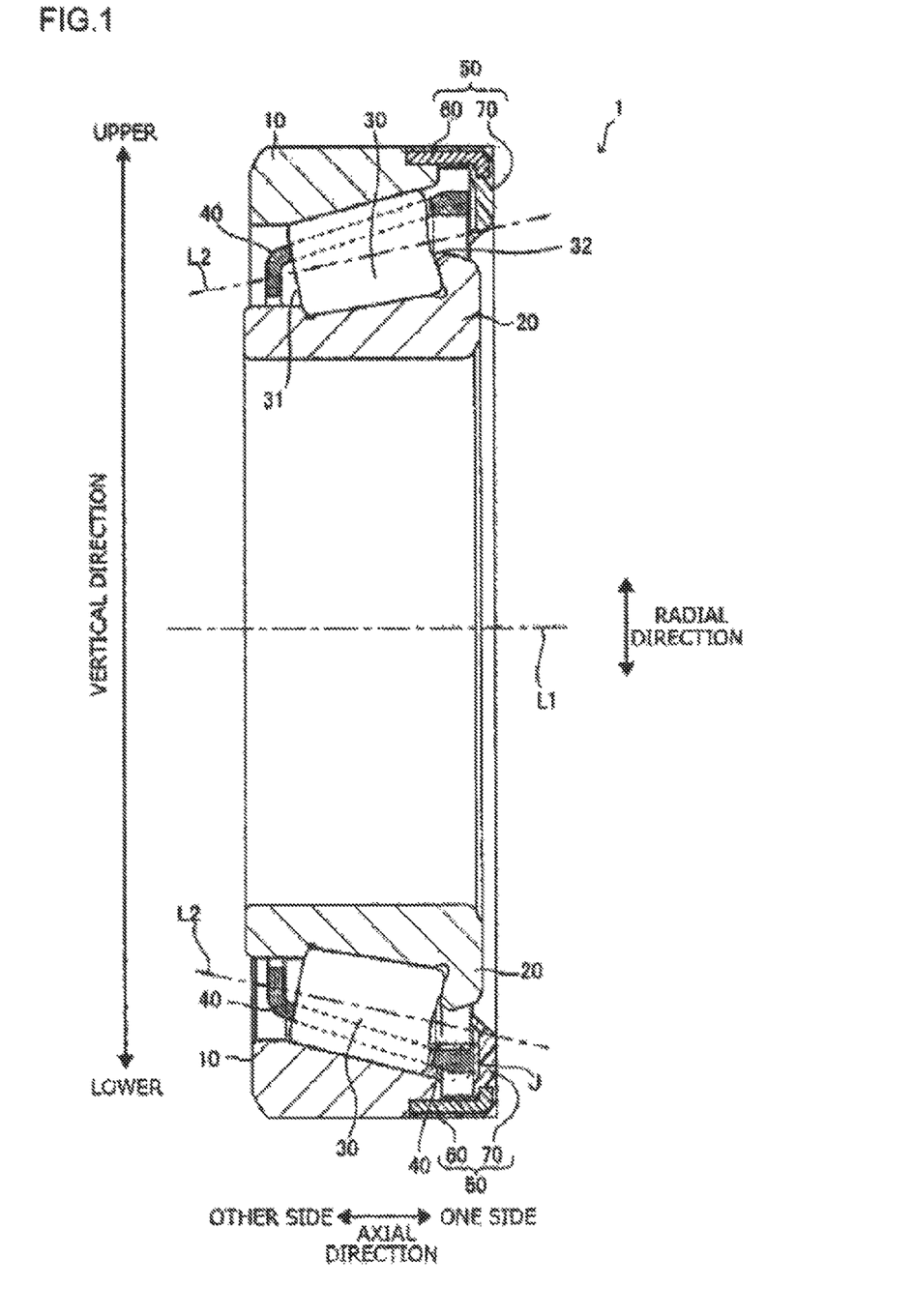
FIG. 1 is a sectional view of a tapered roller bearing according to an embodiment of the present invention.

FIG. 1 is a sectional view of a tapered roller bearing 1 according to an embodiment of the present invention. FIG. 1 is a sectional view taken along a center axis L1 of the tapered roller bearing 1. Herein, the term "axial direction", when used alone, means the direction in which the center axis L1 extends.

As illustrated in FIG. 1, the tapered roller bearing 1 includes an outer ring 10, an inner ring 20, a plurality of tapered rollers 30, a cage 40, and a lubricating oil holding member 50. The outer ring 10, the inner ring 20, the cage 40, and the lubricating oil holding member 50 are annular members provided coaxially with the center axis L1 of the tapered roller bearing 1.

As illustrated in FIG. 1, the outer ring 10 and the inner ring 20 are disposed such that the inner ring 20 is fitted on the inner side, in the radial direction, of the outer ring 10. The cage 40 is disposed in a space interposed between the outer ring 10 and the inner ring 20 in the radial direction. The tapered rollers 30 are held by the cage 40. The lubricating oil holding member 50 is attached to an end portion of the outer ring 10 on one side in the axial direction.

The tapered rollers 30 each have a truncated cone shape. A center axis L2 of the tapered roller 30 is inclined with respect to the center axis L1. The center axis L2 extends away from the center axis L1 as the center axis L2 extends from an end face 31 (hereinafter referred to as a "small end face 31") of the tapered roller 30 on the small diameter side toward an end face 32 (hereinafter referred to as a "large end face 32") on the large diameter side.

In the following description herein, the side on which the large end face 32 of the tapered roller 30 is disposed in the axial direction is referred to as one side in the axial direction. The side on which the small end face 31 of the tapered roller 30 is disposed in the axial direction is referred to as the other side in the axial direction. In other words, the right side of the sheet surface of FIG. 1 is referred to as one side in the axial direction, and the left side of the sheet surface is referred to as the other side in the axial direction. The vertical direction of the tapered roller bearing 1 corresponds to the vertical direction of the sheet surface of FIG. 1, and is parallel to the radial direction of the tapered roller bearing 1. In FIG. 1, the upper part of the sheet surface corresponds to the upper part of the tapered roller bearing 1, and the lower part of the sheet surface corresponds to the lower part of the tapered roller bearing 1.

Figure 2:
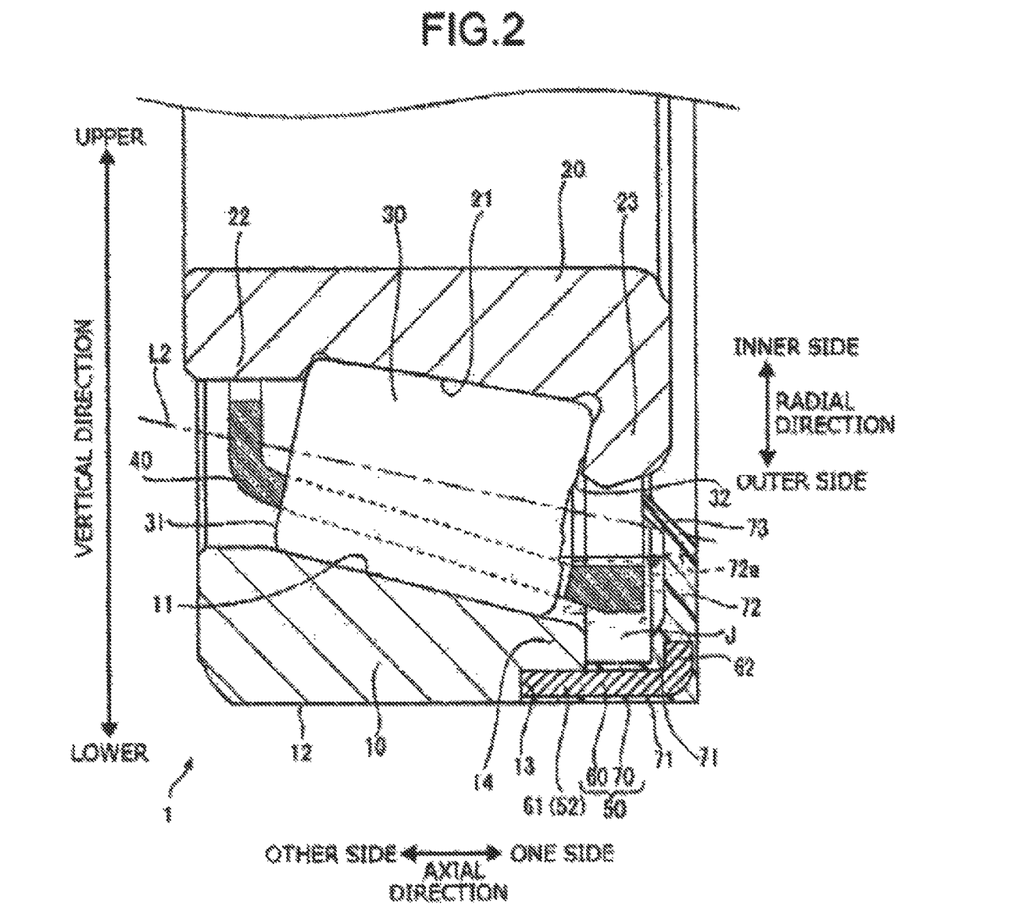
FIG. 2 is an enlarged view of the tapered roller bearing illustrated in FIG. 1.

FIG. 2 is an enlarged sectional view of the lower part of the tapered roller bearing 1. As illustrated in FIG. 2, the outer ring 10 has a first raceway surface 11 on the inner peripheral surface thereof. The first raceway surface 11 has a tapered shape in which the distance from the center axis L1 to the first raceway surface 11 becomes smaller from one side in the axial direction toward the other side in the axial direction.

An annular stepped surface 13 is formed along the circumferential direction on an outer peripheral surface 12 of the outer ring 10. The stepped surface 13 is formed on one side in the axial direction with respect to the center portion of the outer ring 10 in the axial direction. The stepped surface 13 is parallel to a plane that is perpendicular to the axial direction. That is, the stepped surface 13 has an annular shape as seen in the axial direction. An end portion of the outer ring 10 on one side in the axial direction with respect to the stepped surface 13 is a thin-walled portion 14 that is thinner in the radial direction than the other side in the axial direction.

As illustrated in FIG. 2, the inner ring 20 has a second raceway surface 21 on the outer peripheral surface thereof. The second raceway surface 21 has a tapered shape in which the distance from the center axis L1 to the second raceway surface 21 becomes smaller from one side in the axial direction toward the other side in the axial direction.

The inner ring 20 has a cone front face rib (hereinafter referred to as a small rib) 22 which is an end portion of the inner ring 20 on the other side in the axial direction with respect to the second raceway surface 21. The small rib 22 projects radially outward with respect to an end portion of the second raceway surface 21 on the other side in the axial direction. The small rib 22 faces the small end faces 31 of the tapered rollers 30. The inner ring 20 has a cone back face rib (hereinafter referred to as a large rib) 23 which is an end portion of the inner ring 20 on one side in the axial direction with respect to the second raceway surface 21. The large rib 23 projects radially outward with respect to an end portion of the second raceway surface 21 on one side in the axial direction. The large rib 23 faces the large end faces 32 of the tapered rollers 30. The tapered rollers 30 are disposed in a space formed between the first raceway surface 11 and the second raceway surface 21.

Figure 3:
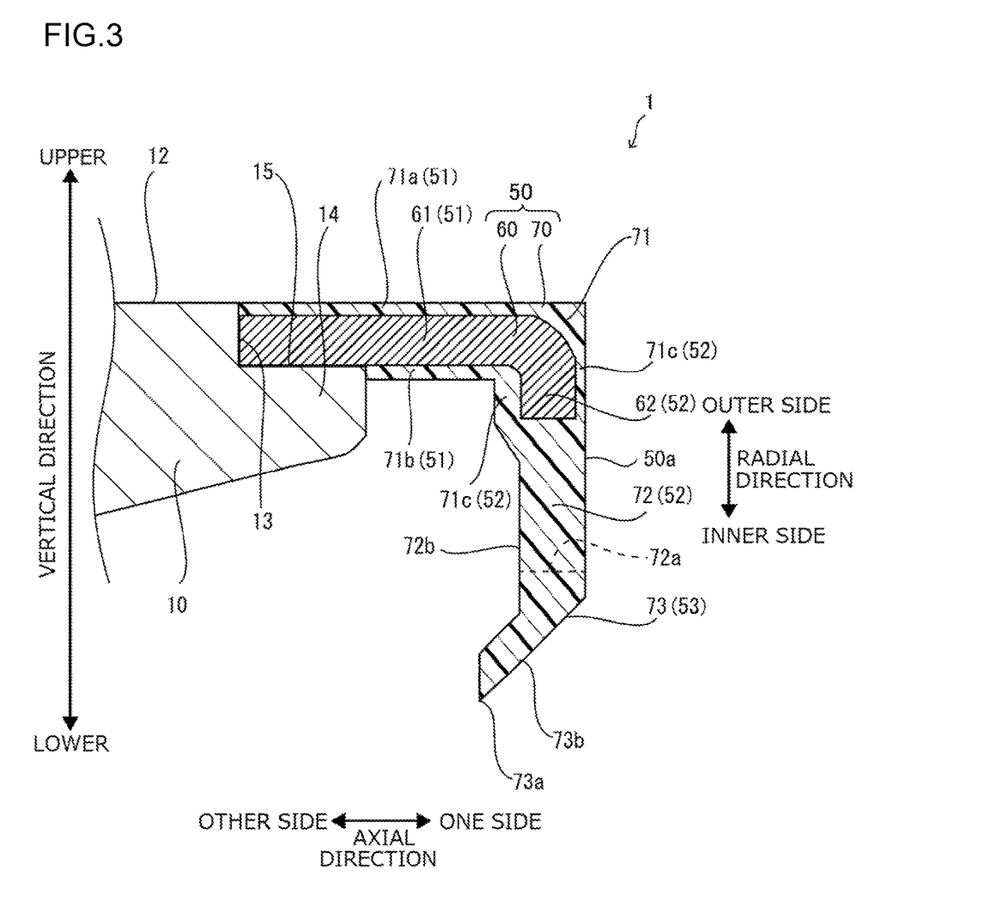
FIG. 3 is an enlarged view of an outer ring and a lubricating oil holding member of the tapered roller bearing illustrated in FIG. 1.

The lubricating oil holding member 50 will be described in detail below with reference to FIG. 3. FIG. 3 is an enlarged view of an end portion of the outer ring 10 on one side in the axial direction and the lubricating oil holding member 50 in the upper part of the tapered roller bearing 1 illustrated in FIG. 1. In FIG. 3, constituent elements other than the outer ring 10 and the lubricating oil holding member 50 are not illustrated.

As illustrated in FIG. 3, the lubricating oil holding member 50 is fixed to the thin-walled portion 14 (an end portion of the outer ring 10 on one side in the axial direction). The lubricating oil holding member 50 includes a ring 60 and a lip 70.

The ring 60 includes a ring body 61 in a cylindrical shape, and an annular lug 62 that projects radially inward from the inner peripheral surface of the ring body 61. The ring body 61 and the lug 62 are formed integrally with each other. The inside diameter of the ring body 61 is determined such that the ring body 61 can be press-fitted with an outer peripheral surface 15 of the thin-walled portion 14 of the outer ring 10. The lug 62 is formed at an end portion of the ring body 61 on one side in the axial direction.

The lip 70 includes a ring covering portion 71, a lip body 72, and a plurality of hook portions 73. The lip 70 is formed from a material such as a resin that is elastic. The lip 70 is formed of rubber such as nitrile rubber or acrylic rubber, for example.

The ring covering portion 71 covers a part of the ring body 61 of the ring 60. The ring covering portion 71 includes an outer peripheral covering portion 71a, an inner peripheral covering portion 71b, and a lug covering portion 71c.

The outer peripheral covering portion 71a covers the entire outer peripheral surface of the ring body 61. The inner peripheral covering portion 71b covers a part of the inner peripheral surface of the ring body 61. Specifically, the inner peripheral covering portion 71b covers a portion of the inner peripheral surface of the ring body 61 that does not contact the outer peripheral surface 15 of the thin-walled portion 14 when the lubricating oil holding member 50 is fixed to the thin-walled portion 14 (an end portion of the outer ring 10 on one side in the axial direction). The lug covering portion 71c covers the entire lug 62 of the ring 60.

Figure 4:
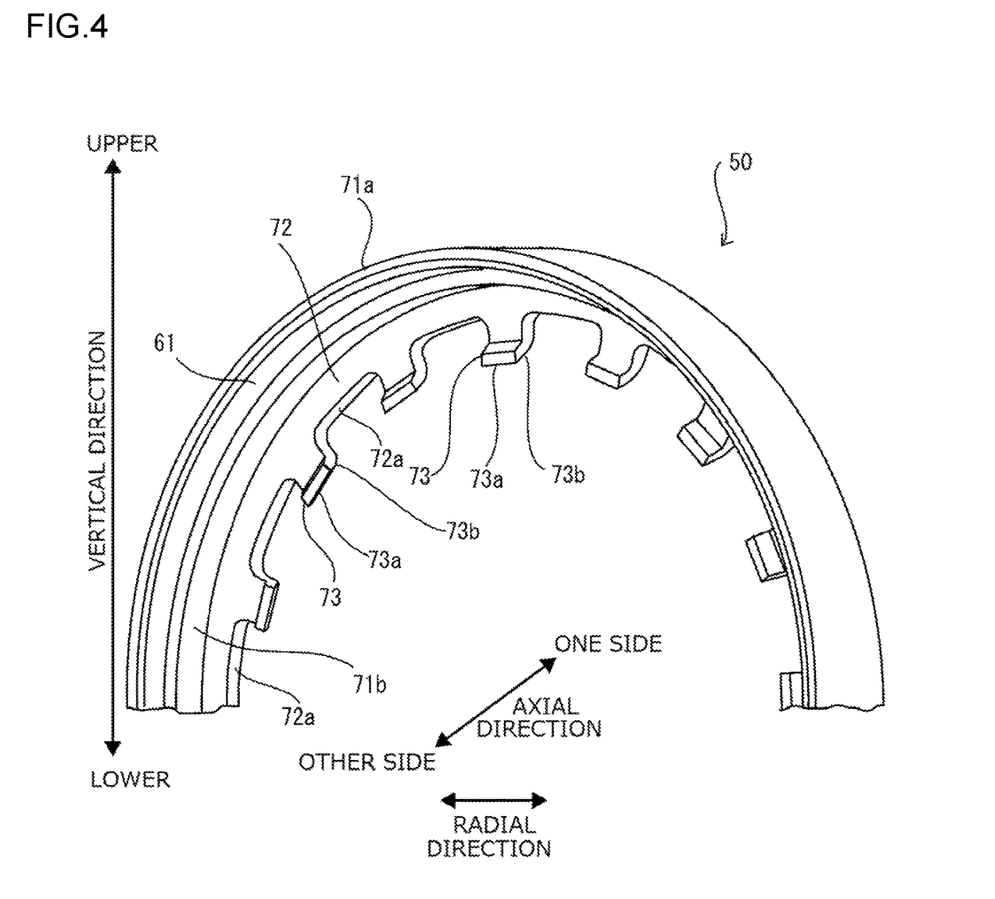
FIG. 4 is a perspective view of a part of the lubricating oil holding member of the tapered roller bearing illustrated in FIG. 1.

FIG. 4 is a perspective view of a part of the lubricating oil holding member 50. In FIG. 4, reference numerals for some of the hook portions 73 are not indicated.

Figure 5:
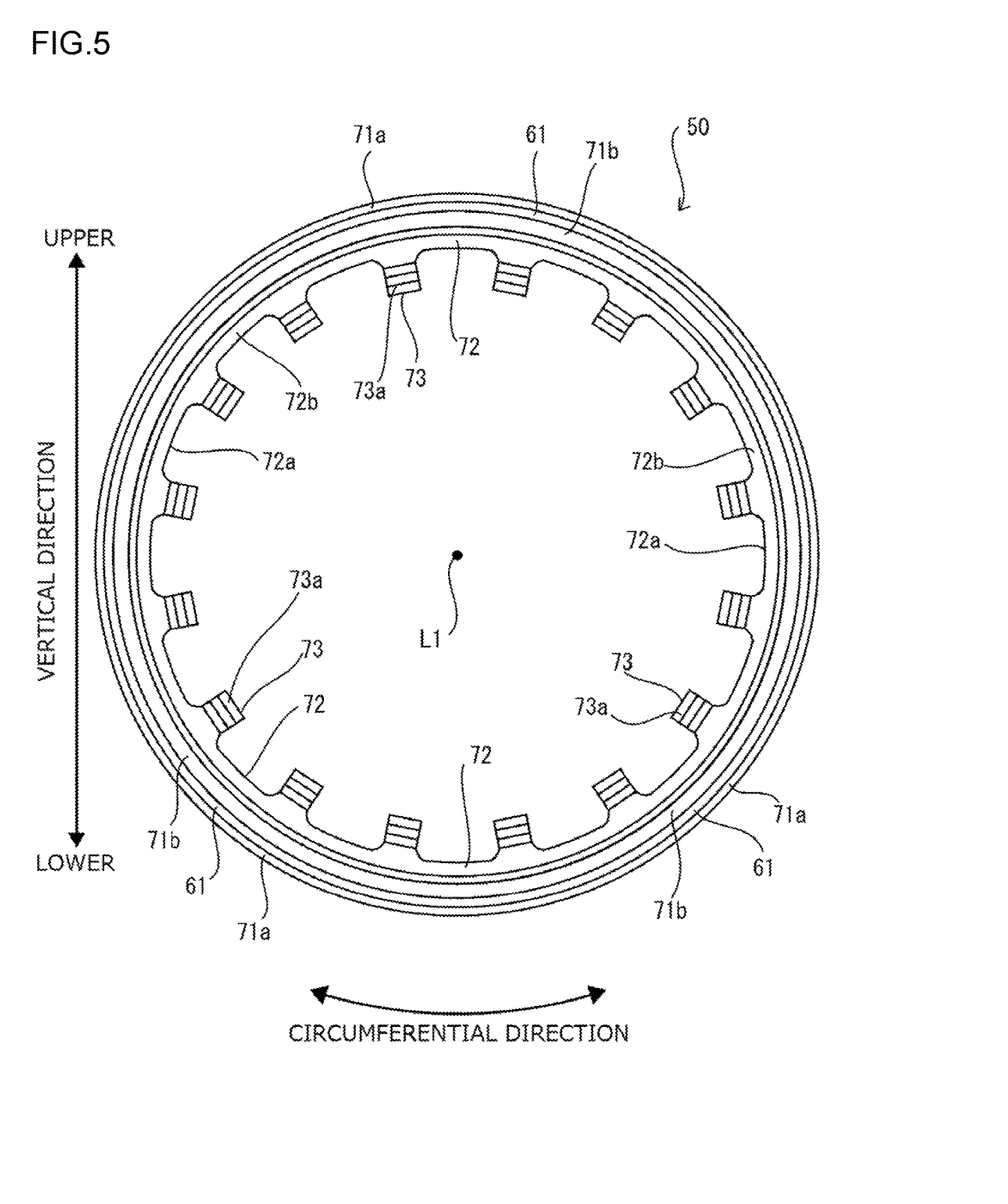
FIG. 5 is a view of the lubricating oil holding member of the tapered roller bearing illustrated in FIG. 1 as seen from the other side in the axial direction.

FIG. 5 is a view of the lubricating oil holding member 50 as seen from the other side in the axial direction. As illustrated in FIG. 5, the lip body 72 is positioned on the inner side in the radial direction with respect to the lug covering portion 71c of the ring covering portion 71 of the lip 70, and has an annular shape as seen in the axial direction.

As illustrated in FIG. 5, the hook portions 73 each have a rectangular shape as seen in the axial direction. The hook portions 73 project radially inward from the inner peripheral surface of the lip body 72. Specifically, as illustrated in FIG. 4, the hook portions 73 each have a hook shape in which the hook portion 73 extends radially inward from the inner peripheral surface of the lip body 72 and is thereafter bent toward the other side in the axial direction. Thus, as illustrated in FIG. 3, a distal end 73a of the hook portion 73 on the inner side in the radial direction is positioned on the other side in the axial direction with respect to a surface 72b of the lip body 72 on the other side in the axial direction. The hook portions 73 are disposed so as to be positioned at equal intervals along the circumferential direction.

As illustrated in FIG. 3, the hook portions 73 each have an inclined surface 73b. The inclined surface 73b has a rectangular shape as seen in the axial direction. The inclined surface 73b has a tapered shape in which the distance from the center axis L1 to the inclined surface 73b becomes larger from the other side in the axial direction toward one side in the axial direction. An end portion of the inclined surface 73b on one side in the axial direction is continuous with an end face 50a of the lubricating oil holding member 50 on one side in the axial direction. An end portion of the inclined surface 73b on the other side in the axial direction is the distal end 73a of the hook portion 73 on the inner side in the radial direction.

The number of the hook portions 73 of the lubricating oil holding member 50 is preferably the same as the number of the tapered rollers 30 of the tapered roller bearing 1. The reason will be described later.

With the ring 60 and the lip 70 combined with each other, the lubricating oil holding member 50 as a whole has a shape in which a tubular portion 51, an annular portion 52, and a projecting portion 53 are integral with each other.

The tubular portion 51 corresponds to the ring body 61, the outer peripheral covering portion 71a of the lip 70, and the inner peripheral covering portion 71b of the lip 70. The tubular portion 51 is formed in the shape of a cylinder that extends in the axial direction, and is fixed to the thin-walled portion 14 which is an end portion of the outer ring 10 on one side in the axial direction. The annular portion 52 corresponds to the lug 62, the lug covering portion 71c of the lip 70, and the lip body 72 of the lip 70. The annular portion 52 is formed in the shape of a circular ring that extends in the radial direction, and is connected to an end portion of the tubular portion 51 on one side in the axial direction. The projecting portion 53 corresponds to the hook portions 73. The projecting portion 53 projects radially inward from the inner peripheral surface of the annular portion 52 in the radial direction.

As illustrated in FIG. 3, the lubricating oil holding member 50 is fitted with the thin-walled portion 14 such that the inner peripheral surface of the ring body 61 contacts, in the radial direction, the outer peripheral surface 15 of the thin-walled portion 14 (an end portion of the outer ring 10 on one side in the axial direction) of the outer ring 10. That is, the ring body 61 is press-fitted with the thin-walled portion 14 of the outer ring 10. Consequently, the lubricating oil holding member 50 is fixed so as to be integral with the outer ring 10.

As illustrated in FIG. 2, lubricating oil J is stored in the lower part, in the vertical direction, of a space formed between the outer ring 10 and the lubricating oil holding member 50. That is, the lubricating oil J remains in the lower part of the tapered roller bearing 1. The height of the liquid surface of the lubricating oil J is generally the same as the height of a portion of an end portion of the lip 70 on the inner side in the radial direction that is positioned in the lowermost part of the tapered roller bearing 1. In other words, the height of the liquid surface of the lubricating oil J is generally the same as the height of the upper end of a portion of the lip 70 that is positioned in the lowermost part of the tapered roller bearing 1.

When the tapered roller bearing 1 is stationary, the lubricating oil J contacts a part of the outer ring 10, a part of the tapered roller 30, and a part of the cage 40. When the tapered roller bearing 1 is rotated, the lubricating oil J which is accumulated in the lower part of the tapered roller bearing 1 is splashed along with the rotation, and supplied to the first raceway surface 11, the second raceway surface 21, and so forth. The supplied lubricating oil J reduces friction caused between the tapered rollers 30 and the first raceway surface 11, between the tapered rollers 30 and the second raceway surface 21, etc.

The tapered roller bearing 1 is assembled to a differential device etc. of an automobile, for example, and disposed inside a housing (not illustrated).

The tapered roller bearing 1 is rotated along with drive of the differential device. Consequently, a part of the lubricating oil J which is accumulated in the lower part of the tapered roller bearing 1 flows toward the outside of the tapered roller bearing 1. In the case where the amount of the lubricating oil J which is accumulated in the lower part of the tapered roller bearing 1 is reduced, the resistance against seizure of the tapered roller bearing 1 may be lowered. In order to suppress a reduction in the resistance against seizure of the tapered roller bearing 1, it is necessary that the lubricating oil J which has flowed toward the outside of the tapered roller bearing 1 should be caused to flow again into a space between the outer ring 10 and the lubricating oil holding member 50 in the lower part of the tapered roller bearing 1.

Figure 6:
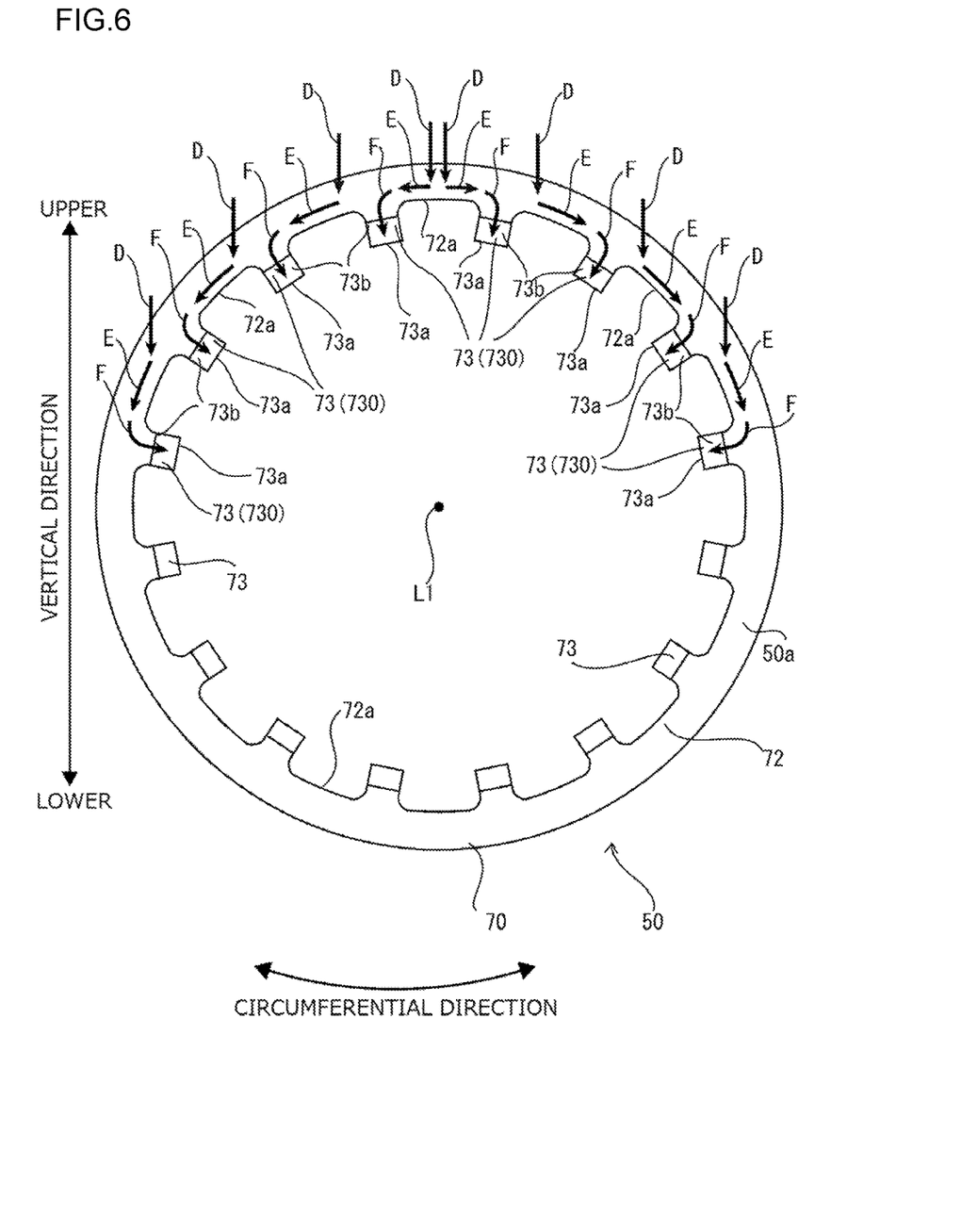
FIG. 6 illustrates paths along which lubricating oil that has adhered to an end face of the lubricating oil holding member on one side in the axial direction flows in the tapered roller bearing illustrated in FIG. 1.

FIG. 6 illustrates paths along which the lubricating oil which has adhered to the end face 50a of the lubricating oil holding member 50 on one side in the axial direction flows in the tapered roller bearing 1. In FIG. 6, only the lubricating oil holding member 50 is illustrated, and the outer ring 10, the inner ring 20, and the tapered rollers 30 are not illustrated. In FIG. 6, reference numerals for some of the hook portions 73 are not indicated.

The lubricating oil J which has flowed from the lower part of the tapered roller bearing 1 toward the outside of the tapered roller bearing 1 and lubricating oil scattered from the differential device adhere to the end face 50a of the lubricating oil holding member 50. The lubricating oil which has adhered to the end face 50a flows downward in the vertical direction to reach an edge of an inner peripheral surface 72a of the lip body 72 on one side in the axial direction as indicated by the arrows D.

The lubricating oil is designed and prepared so as to have a relatively low surface tension to easily make its way into a space between the tapered rollers 30 and the first raceway surface 11 of the outer ring 10, a space between the tapered rollers 30 and the second raceway surface 21 of the inner ring 20, and so forth. Therefore, in the case where the lubricating oil reaches an edge of the inner peripheral surface 72a of the lip body 72 on one side in the axial direction, the lubricating oil flows through paths indicated by the arrows E, rather than forming oil droplets at an edge of the inner peripheral surface 72a of the lip body 72 on one side in the axial direction. That is, the lubricating oil flows in the circumferential direction along an edge of the inner peripheral surface 72a of the lip body 72 on one side in the axial direction.

In the case where the lubricating oil which flows through the paths indicated by the arrows E reaches hook portions 730, of the plurality of hook portions 73, that extend downward in the vertical direction from the inner peripheral surface 72a of the lip body 72, the lubricating oil flows through paths indicated by the arrows F. That is, the lubricating oil flows on the inclined surfaces 73b of the hook portions 730 to reach the distal ends 73a of the hook portions 730. After reaching the distal ends 73a of the hook portions 730, the lubricating oil cannot flow downward in the vertical direction along the end face 50a of the lubricating oil holding member 50 or the distal ends 73a of the hook portions 730. The distal ends 73a of the hook portions 730 are positioned on the other side in the axial direction with respect to the surface 72b of the lip body 72 on the other side in the axial direction. As a result, the lubricating oil forms oil droplets at the distal ends 73a of the hook portions 730 to be dropped onto the inner peripheral surface of the tubular portion 51 of the lubricating oil holding member 50 or the outer peripheral surface of the large rib 23. The lubricating oil which has been dropped flows along the inner peripheral surface of the tubular portion 51 of the lubricating oil holding member 50 or the outer peripheral surface of the large rib 23 to be moved to a space between the outer ring 10 and the lubricating oil holding member 50 in the lower part of the tapered roller bearing 1.

With the tapered roller bearing 1 according to the embodiment, in this way, the lubricating oil which has adhered to the end face 50a of the lubricating oil holding member 50 can be collected efficiently. As a result, the resistance against seizure of the tapered roller bearing 1 can be improved.

Figure 7:
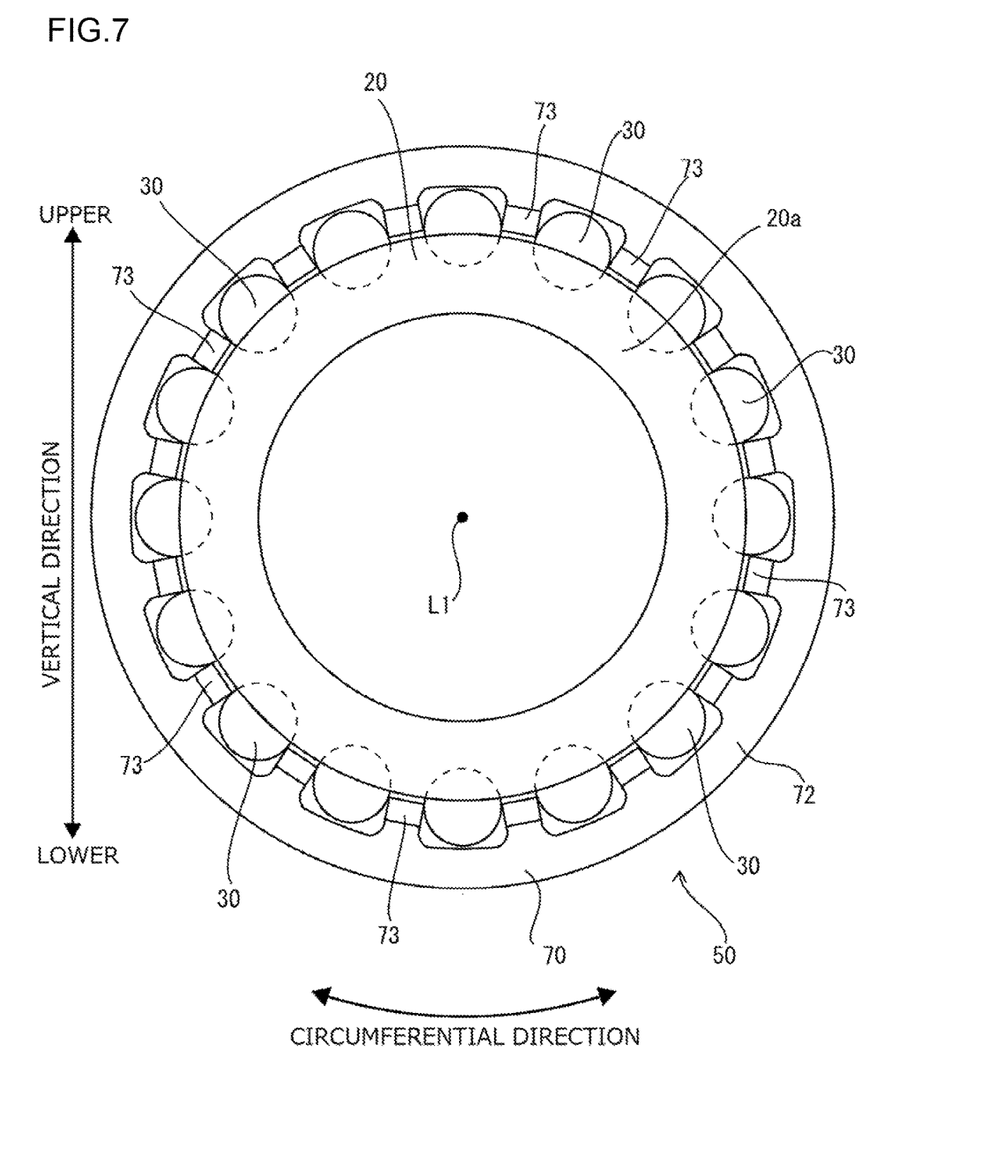
FIG. 7 illustrates the positional relationship between tapered rollers and the lubricating oil holding member during assembly of the tapered roller bearing illustrated in FIG. 1.

FIG. 7 illustrates the positional relationship between the tapered rollers 30 and the lubricating oil holding member 50 during assembly of the tapered roller bearing 1 illustrated in FIG. 1. FIG. 7 corresponds to a view of the inner ring 20 on which the lubricating oil holding member 50 and the tapered rollers 30 are disposed as seen from one side in the axial direction.

In FIG. 7, only the inner ring 20 on which the lubricating oil holding member 50 and the tapered rollers 30 are disposed is illustrated, and the other members are not illustrated. In FIG. 7, reference numerals for some of the tapered rollers 30 and some of the hook portions 73 are not indicated, and reference numerals for the distal ends 73a and the inclined surfaces 73b of the hook portions 73 are not indicated.

As illustrated in FIG. 7, the diameter of the tapered rollers 30 is generally the same as the interval between two hook portions 73 that are adjacent to each other in the circumferential direction in the lubricating oil holding member 50. The number of the tapered rollers 30 and the number of the hook portions 73 are the same as each other at 16. The number of the tapered rollers 30 and the number of the hook portions 73 are the same as each other, and the hook portions 73 are disposed at equal intervals in the circumferential direction. Consequently, damage to the hook portions 73 of the lubricating oil holding member 50 can be prevented during assembly of the tapered roller bearing 1.

Assembly of the tapered roller bearing 1 will be described. In the assembly of the tapered roller bearing 1, the lubricating oil holding member 50 is fixed to the thin-walled portion 14 (an end portion of the outer ring 10 on one side in the axial direction). Specifically, as illustrated in FIG. 3, the lubricating oil holding member 50 is fitted with an end portion of the outer ring 10 on one side in the axial direction such that the inner peripheral surface of the ring body 61 which constitutes the lubricating oil holding member 50 contacts, in the radial direction, the outer peripheral surface 15 of the thin-walled portion 14 (an end portion of the outer ring 10 on one side in the axial direction) of the outer ring 10.

The tapered rollers 30 are disposed on the second raceway surface 21 of the inner ring 20. Specifically, the tapered rollers 30 are disposed on the second raceway surface 21 of the inner ring 20 at equal intervals in the circumferential direction using the cage 40.

The inner ring 20 on which the tapered rollers 30 are disposed is fitted inside the outer ring 10 to which the lubricating oil holding member 50 is fixed. In this event, the inner ring 20 on which the tapered rollers 30 are disposed is fitted into the outer ring 10 to which the lubricating oil holding member 50 is fixed from one side in the axial direction. Consequently, assembly of the tapered roller bearing 1 is completed.

The hook portions 73 of the lubricating oil holding member 50 and the tapered rollers 30 are aligned with each other before the inner ring 20 on which the tapered rollers 30 are disposed is fitted inside the outer ring 10 to which the lubricating oil holding member 50 is fixed.

Specifically, as illustrated in FIG. 7, the center axis, in the axial direction, of the outer ring 10 to which the lubricating oil holding member 50 is fixed and the center axis, in the axial direction, of the inner ring 20 on which the tapered rollers 30 are disposed are aligned with the center axis L1. The outer ring 10 to which the lubricating oil holding member 50 is fixed or the tapered rollers 30 which are disposed on the inner ring 20 are rotated about the center axis L1 such that the hook portions 73 of the lubricating oil holding member 50 are positioned, as seen in the axial direction, between two tapered rollers 30 that are adjacent to each other in the circumferential direction. Consequently, alignment between the hook portions 73 of the lubricating oil holding member 50 and the tapered rollers 30 is completed.

Alignment is performed as described above. Therefore, the inner ring 20 on which the tapered rollers 30 are disposed can be inserted into the outer ring 10 to which the lubricating oil holding member 50 is fixed from one side in the axial direction without bringing the tapered rollers 30 into contact with the hook portions 73 of the lubricating oil holding member 50. The hook portions 73 of the lubricating oil holding member 50 can be prevented from being deformed by the tapered rollers 30 when the inner ring 20 is inserted into the outer ring 10 to which the lubricating oil holding member 50 is fixed from one side in the axial direction. As a result, occurrence of damage such as a crack in the hook portions 73 of the lubricating oil holding member 50 can be suppressed.

FIG. 7 illustrates a case where the diameter of the tapered rollers 30 is generally the same as the interval between the hook portions 73 which are adjacent to each other in the circumferential direction. However, the diameter of the tapered rollers 30 may be larger than the interval between the hook portions 73 which are adjacent to each other in the circumferential direction. Also in this case, deformation of the hook portions 73 of the lubricating oil holding member 50 can be suppressed when inserting the inner ring 20, on which the tapered rollers 30 are disposed, into the outer ring 10, to which the lubricating oil holding member 50 is fixed, from one side in the axial direction by performing alignment as discussed above. Therefore, occurrence of damage such as a crack in the hook portions 73 of the lubricating oil holding member 50 can be prevented.

The diameter of the tapered rollers 30 may be smaller than the interval between the hook portions 73 which are adjacent to each other in the circumferential direction. Also in this case, deformation of the hook portions 73 of the lubricating oil holding member 50 can be suppressed when inserting the inner ring 20, on which the tapered rollers 30 are disposed, into the outer ring 10, to which the lubricating oil holding member 50 is fixed, from one side in the axial direction by performing alignment as discussed above.

Figure 8:
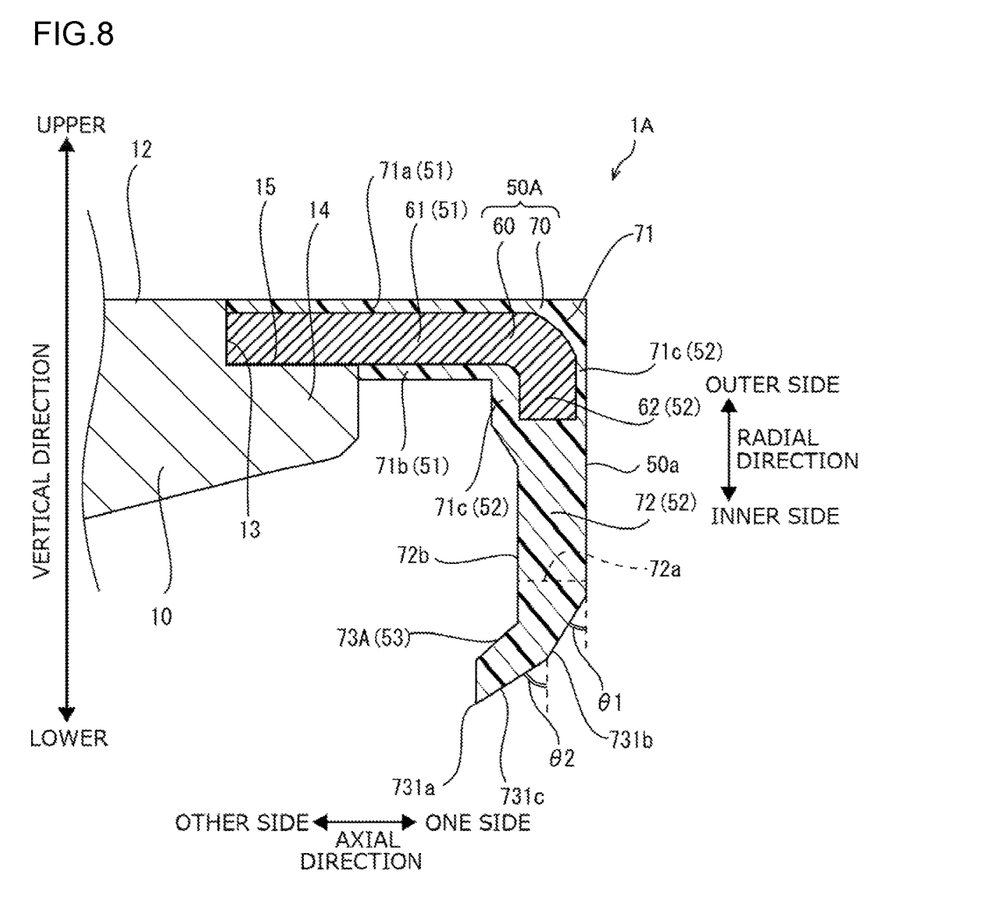
FIG. 8 is an enlarged sectional view of a part of a tapered roller bearing according to a first modification of the embodiment of the present invention.

FIG. 8 is an enlarged sectional view of a part of a tapered roller bearing 1A according to a first modification. In FIG. 8, constituent elements other than the outer ring 10 and a lubricating oil holding member 50A are not illustrated.

As illustrated in FIG. 8, the tapered roller bearing 1A has the same configuration as that of the tapered roller bearing 1 except for including the lubricating oil holding member 50A in place of the lubricating oil holding member 50 of the tapered roller bearing 1. In the lubricating oil holding member 50A, the lip 70 has hook portions 73A. The hook portions 73A have the same configuration as that of the hook portions 73 except for having inclined surfaces 731b and 731c in place of the inclined surface 73b.

The inclined surfaces 731b and 731c each have a rectangular shape as seen in the axial direction. The inclined surfaces 731b and 731c each have a tapered shape in which the distance from the center axis L1 to the inclined surfaces 731b and 731c becomes larger from the other side in the axial direction toward one side in the axial direction. An end portion of the inclined surface 731b on one side in the axial direction is continuous with the end face 50a (an end face of the annular portion 52 on one side in the axial direction) of the lubricating oil holding member 50A on one side in the axial direction. An end portion of the inclined surface 731b on the other side in the axial direction is continuous with an end portion of the inclined surface 731c on one side in the axial direction. An end portion of the inclined surface 731c on the other side in the axial direction is a distal end 731a of the hook portion 73A on the inner side in the radial direction. The distal ends 731a of the hook portions 73A are positioned on the other side in the axial direction with respect to the surface 72b of the lip body 72 on the other side in the axial direction.

An angle θ1 is formed between the inclined surface 731b and the end face 50a of the lubricating oil holding member 50A on one side in the axial direction which is perpendicular to the center axis L1. An angle θ2 is formed between the inclined surface 731c and the end face 50a of the lubricating oil holding member 50A on one side in the axial direction which is perpendicular to the center axis L1. The angle θ2 is larger than the angle θ1.

The hook portion 73A can be provided with a high strength by constituting an end face of the hook portion 73A on one side in the axial direction using the inclined surfaces 731b and 731c as illustrated in FIG. 8. The angle formed between a surface of the hook portion 73A on one side in the axial direction and the end face 50a of the lubricating oil holding member 50A on one side in the axial direction becomes larger toward the inner side in the radial direction. Consequently, the lubricating oil which flows downward in the vertical direction along the hook portion 73A can be efficiently moved to the distal end 731a of the hook portion 73A. As a result, lubricating oil outside the tapered roller bearing 1A can be collected efficiently.

Figure 9:
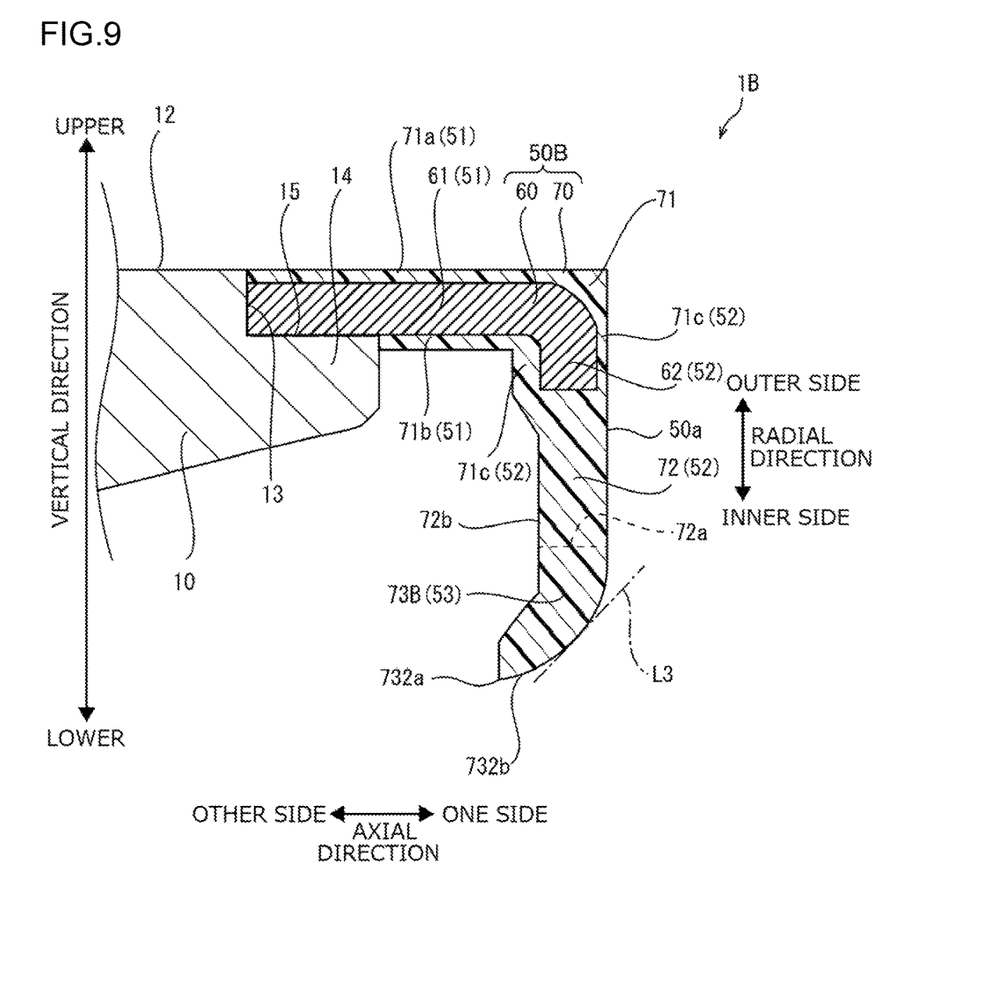
FIG. 9 is an enlarged sectional view of a part of a tapered roller bearing according to a second modification of the embodiment of the present invention.

FIG. 9 is an enlarged sectional view of a part of a tapered roller bearing 1B according to a second modification. In FIG. 9, constituent elements other than the outer ring 10 and a lubricating oil holding member 50B are not illustrated.

As illustrated in FIG. 9, the tapered roller bearing 1B has the same configuration as that of the tapered roller bearing 1 except for including the lubricating oil holding member 50B in place of the lubricating oil holding member 50 of the tapered roller bearing 1. In the lubricating oil holding member 50B, the lip 70 has hook portions 73B. The hook portions 73B have the same configuration as that of the hook portions 73 except for having an inclined surface 732b in place of the inclined surface 73b.

The inclined surface 732b has a rectangular shape as seen in the axial direction. The inclined surface 732b has a tapered shape in which the distance from the center axis L1 to the inclined surface 732b becomes larger from the other side in the axial direction toward one side in the axial direction. An end portion of the inclined surface 732b on one side in the axial direction is continuous with the end face 50a of the lubricating oil holding member 50B on one side in the axial direction. An end portion of the inclined surface 732b on the other side in the axial direction is a distal end 732a of the hook portion 73B on the inner side in the radial direction. The distal ends 732a of the hook portions 73B are positioned on the other side in the axial direction with respect to the surface 72b of the lip body 72 on the other side in the axial direction.

The inclined surface 732b is a curved surface that is convex radially outward in the axial direction. That is, the angle formed between an axial component of a tangent L3 to the inclined surface 732b and the end face 50a of the lubricating oil holding member 50B on one side in the axial direction becomes larger toward the inner side in the radial direction. Consequently, the lubricating oil which flows downward in the vertical direction along the hook portion 73B can be efficiently moved to the distal end 732a of the hook portion 73B. As a result, lubricating oil outside the tapered roller bearing 1B can be collected efficiently.

Figure 10:
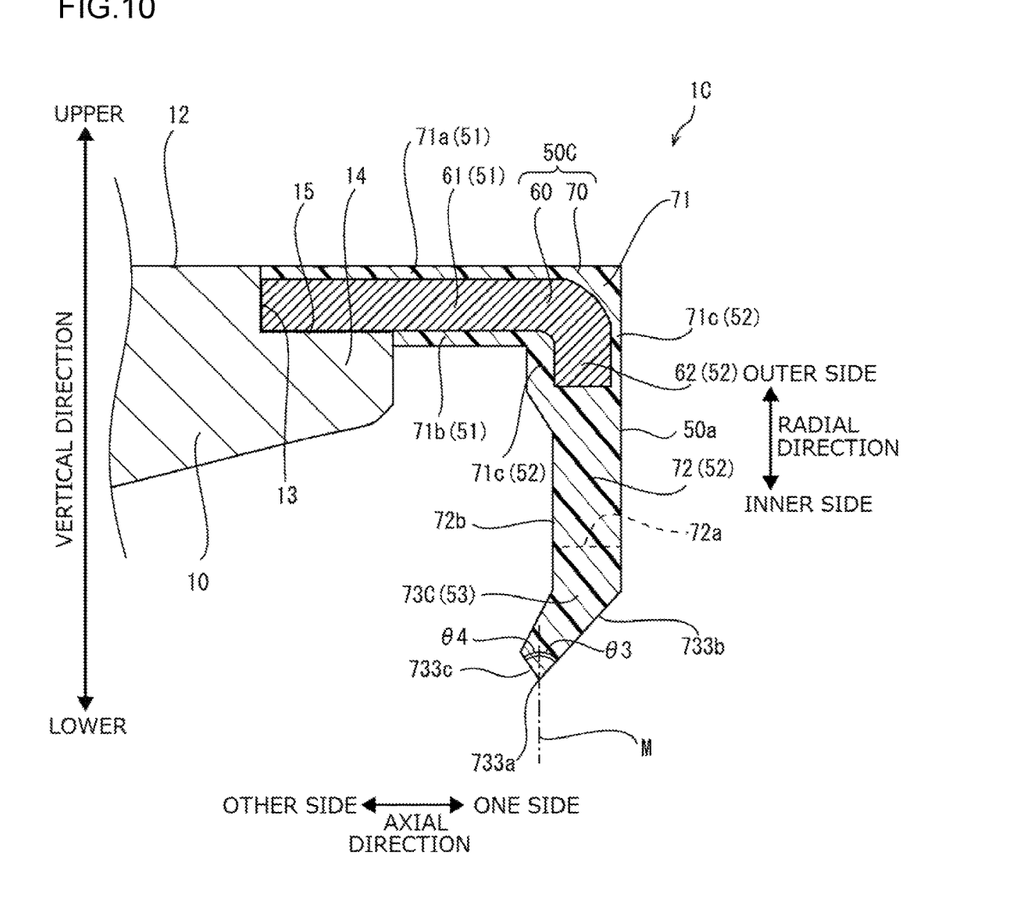
FIG. 10 is an enlarged sectional view of a part of a tapered roller bearing according to a third modification of the embodiment of the present invention.

FIG. 10 is an enlarged sectional view of a part of a tapered roller bearing 1C according to a third modification. In FIG. 10, constituent elements other than the outer ring 10 and a lubricating oil holding member 50C are not illustrated.

As illustrated in FIG. 10, the tapered roller bearing 1C has the same configuration as that of the tapered roller bearing 1 except for including the lubricating oil holding member 50C in place of the lubricating oil holding member 50 of the tapered roller bearing 1. In the lubricating oil holding member 50C, the lip 70 has hook portions 73C. The hook portions 73C have the same configuration as that of the hook portions 73 except for having inclined surfaces 733b and 733c in place of the inclined surface 73b.

The inclined surfaces 733b and 733c each have a rectangular shape as seen in the axial direction. The inclined surface 733b has a tapered shape in which the distance from the center axis L1 to the inclined surface 733b becomes larger from the other side in the axial direction toward one side in the axial direction. The inclined surface 733c has a tapered shape in which the distance from the center axis L1 to the inclined surface 733c becomes smaller from the other side in the axial direction toward one side in the axial direction.

An end portion of the inclined surface 733b on one side in the axial direction is continuous with the end face 50a of the lubricating oil holding member 50C on one side in the axial direction. An end portion of the inclined surface 733b on the other side in the axial direction is continuous with an end portion of the inclined surface 733c on one side in the axial direction. The boundary between the inclined surface 733b and the inclined surface 733c is a distal end 733a of the hook portion 73C on the inner side in the radial direction. The distal ends 733a of the hook portions 73C are positioned on the other side in the axial direction with respect to the surface 72b of the lip body 72 on the other side in the axial direction. An angle θ3 is formed between the inclined surface 733b and a plane M that is perpendicular to the center axis L1. An angle θ4 is formed between the inclined surface 733c and the plane M which is perpendicular to the center axis L1. The angle θ4 is smaller than the angle θ3.

As illustrated in FIG. 10, the hook portion 73C is constituted of the distal end 733a on the inner side in the radial direction as the boundary between the inclined surface 733b and the inclined surface 733c, the inclined surface 733b as an end face on one side in the axial direction, and the inclined surface 733c as an end face on the other side in the axial direction. Consequently, the hook portion 73C can be provided with a high strength.

With the tapered roller bearing 1C, the lubricating oil J which has adhered to the end face 50a of the lubricating oil holding member 50C on one side in the axial direction can be collected efficiently. The lubricating oil which has flowed from the end face 50a of the lubricating oil holding member 50C along the inclined surface 733b of the hook portion 73C forms oil droplets at the distal end 733a of the hook portion 73C because of the surface tension. The angle θ4 formed between the inclined surface 733c and the plane M which is perpendicular to the axial direction is smaller than the angle θ3 formed between the inclined surface 733b and the plane M which is perpendicular to the axial direction. Therefore, the center of gravity of the oil droplets formed at the distal end 733a of the hook portion 733 is positioned on the other side in the axial direction with respect to the distal end 733a. The oil droplets formed at the distal end 733a of the hook portion 733 can be dropped into the tapered roller bearing 1C when the oil droplets come off the distal end 733a. As a result, the lubricating oil can be collected efficiently.

Figure 11:
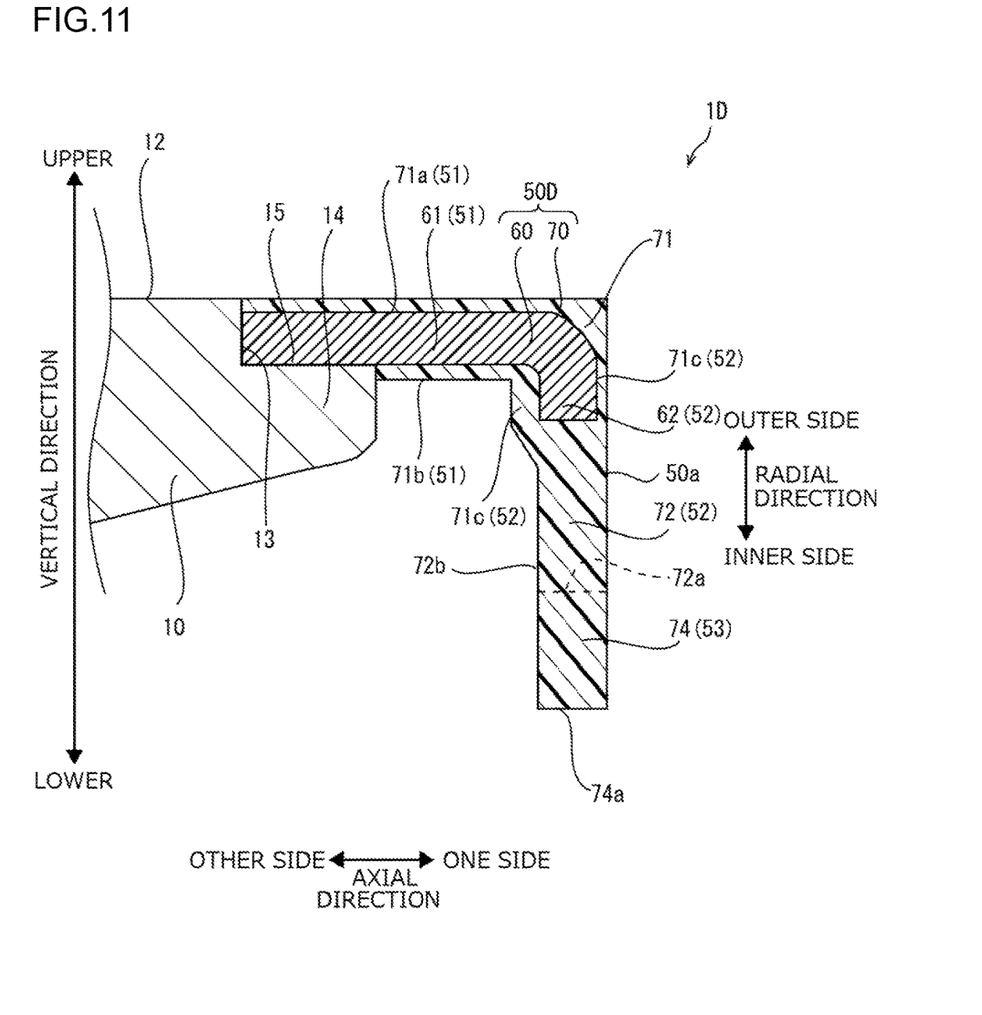
FIG. 11 is an enlarged sectional view of a part of a tapered roller bearing according to a fourth modification of the embodiment of the present invention.

FIG. 11 is an enlarged sectional view of a part of a tapered roller bearing 1D according to a fourth modification. In FIG. 11, constituent elements other than the outer ring 10 and a lubricating oil holding member 50D are not illustrated.

As illustrated in FIG. 11, the tapered roller bearing 1D has the same configuration as that of the tapered roller bearing 1 except for including the lubricating oil holding member 50D in place of the lubricating oil holding member 50 of the tapered roller bearing 1. In the lubricating oil holding member 50D, the lip 70 has protruding portions 74 in place of the hook portions 73. The protruding portions 74 project radially inward from the inner peripheral surface 72a of the lip body 72 of the lip 70.

Also in this case, the lubricating oil which flows along an edge of the inner peripheral surface 72a of the lip body 72 on one side in the axial direction can be collected at an inner peripheral surface 74a which is the distal end of the protruding portion 74, as with the hook portion 73 of the tapered roller bearing 1. As a result, lubricating oil outside the tapered roller bearing 1D can be collected efficiently.

That is, in the lubricating oil holding member, as described above in relation to the embodiment and the first to fourth modifications, it is only necessary that the projecting portion 53 should project radially inward with respect to the inner peripheral surface of the annular portion 52 in the radial direction. In this event, the distal end of the projecting portion 53 on the inner side in the radial direction is preferably positioned on the other side in the axial direction with respect to a surface of the annular portion 52 on the other side in the axial direction. The surface of the annular portion 52 on the other side in the axial direction corresponds to the surface 72b of the lip body 72 on the other side in the axial direction in FIG. 3.

In the embodiment described above, as illustrated in FIG. 5, the number of the hook portions 73 of the lubricating oil holding member 50 is the same as the number of the tapered rollers 30. Therefore, the hook portions 73 are disposed at equal intervals in the circumferential direction. However, the present invention is not limited thereto. The number of the hook portions 73 may be smaller than the number of the tapered rollers 30. Specifically, when two or more hook portions 73 are formed, they are disposed at equal intervals in the circumferential direction.

In the case where the tapered roller bearing is assembled to a differential device etc. of an automobile, for example, at least one of the two or more hook portions 73 extends downward in the vertical direction from the inner peripheral surface 72a of the ring body 72. When the tapered roller bearing is assembled to a housing or a different device, lubricating oil can be caused to flow into a space between the outer ring and the lubricating oil holding member in the lower part of the tapered roller bearing irrespective of the assembly state. In the case where the two or more hook portions 73 are disposed at equal intervals in the circumferential direction, it is not necessary to take the positions of the hook portions 73 into consideration during assembly of the tapered roller bearing. Thus, assembly of the tapered roller bearing is facilitated.

In the case where two or more hook portions 73 are formed, the number of the hook portions 73 is preferably a divisor of the number of the tapered rollers 30. Also in this case, the hook portions 73 can pass through spaces between two adjacent tapered rollers 30 when fitting the inner ring 20 on which the tapered rollers 30 are disposed into the outer ring 10 to which the lubricating oil holding member 50 is fixed. Therefore, damage to the hook portions 73 can be prevented.

In the embodiment described above, as illustrated in FIG. 5, the lubricating oil holding member 50 includes a plurality of hook portions 73. However, the present invention is not limited thereto. It is only necessary that the lubricating oil holding member 50 should include at least one projecting portion 53 formed above the center axis L1 in the vertical direction. Also in this case, it is possible to efficiently collect the lubricating oil which has adhered to the end face 50a of the lubricating oil holding member 50 on one side in the axial direction.

In the embodiment described above, the lip body 72 of the lip 70 of the lubricating oil holding member 50 is perpendicular to the axial direction. However, the lip body 72 may be inclined with respect to the center axis L1. Specifically, it is only necessary that the distance between the center axis L1 and a surface of the lip body 72 on one side in the axial direction should become larger from the other side in the axial direction toward one side in the axial direction.

In the embodiment described above, the hook portions 73 have a rectangular shape as seen in the axial direction.

However, the present invention is not limited thereto. The shape of the hook portions 73 as seen in the axial direction is not specifically limited. For example, the size of the hook portions 73 in the circumferential direction as seen in the axial direction may become smaller toward the inner side in the radial direction.

In the embodiment described above, the lubricating oil holding member 50 includes the ring 60. However, the present invention is not limited thereto. The lubricating oil holding member 50 may not include the ring 60, and the entire lubricating oil holding member 50 may be formed from an elastic material.

While an embodiment of the present invention has been described above, the embodiment discussed above is merely an example for implementation of the present invention. Hence, the present invention is not limited to the embodiment discussed above, and may be implemented by modifying the embodiment discussed above, as appropriate, without departing from the scope and spirit thereof.

With the tapered roller bearing according to the present disclosure, a reduction of lubricating oil stored in the lower portion of the tapered roller bearing can be suppressed.

What is claimed is:

1. A tapered roller bearing comprising:
    an outer ring that has a first raceway surface on an inner peripheral surface of the outer ring;
    an inner ring that has a second raceway surface on an outer peripheral surface of the inner ring and that is disposed coaxially with the outer ring;
    a plurality of tapered rollers disposed in a space between the first raceway surface and the second raceway surface; and
    a lubricating oil holding member fixed to an end portion of the outer ring on one side in an axial direction, wherein
    the lubricating oil holding member includes
        a tubular portion formed in a shape of a cylinder that extends in the axial direction, and fixed to an end portion of the outer ring on one side in the axial direction, of two end portions of the outer ring in the axial direction,
        an annular portion formed in a shape of a circular ring that extends in a radial direction, an end portion of the annular portion on an outer side in the radial direction being connected to an end portion of the tubular portion on one side in the axial direction, and
        a projecting portion that projects radially inward from an inner peripheral surface of the annular portion in the radial direction.

2. The tapered roller bearing according to claim 1, wherein
    a distal end of the projecting portion is positioned on the other side in the axial direction with respect to the end portion of the tubular portion on one side in the axial direction.

3. The tapered roller bearing according to claim 1, wherein:
    a plurality of projecting portions is formed on the inner peripheral surface of the annular portion in the radial direction; and
    the plurality of projecting portions is disposed at equal intervals in a circumferential direction on the inner peripheral surface of the annular portion in the radial direction.

4. The tapered roller bearing according to claim 3, wherein
    a number of the projecting portions which are formed on the inner peripheral surface of the annular portion in the radial direction is a divisor of a number of the tapered rollers.

5. The tapered roller bearing according to claim 1, wherein
    the projecting portion includes a first inclined surface disposed on an inner peripheral surface of the projecting portion, an end portion of the first inclined surface on one side in the axial direction is continuous with an end face of the annular portion on one side in the axial direction, and a distance from a center axis to the first inclined surface becomes larger from the other side in the axial direction toward one side in the axial direction.

6. The tapered roller bearing according to claim 5, wherein:
    the first inclined surface includes
        a first surface, an end portion of which on one side in the axial direction is continuous with the end face of the annular portion on one side in the axial direction, and
        a second surface, an end portion of which on one side in the axial direction is continuous with an end portion of the first surface on the other side in the axial direction; and
    an angle formed between the second surface and a plane that is perpendicular to the center axis is larger than an angle formed between the first surface and the plane which is perpendicular to the center axis.

\* \* \* \* \*